Nov. 1, 1927.
A. Y. DODGE
1,647,397
BRAKE
Filed March 29, 1924      2 Sheets-Sheet 1
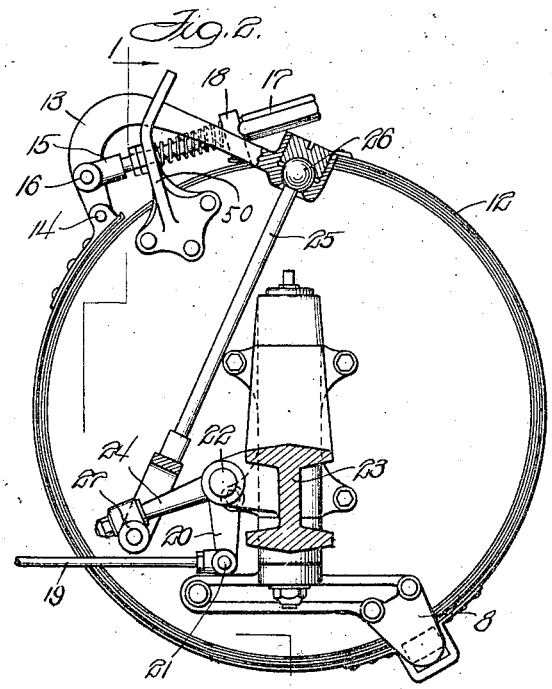
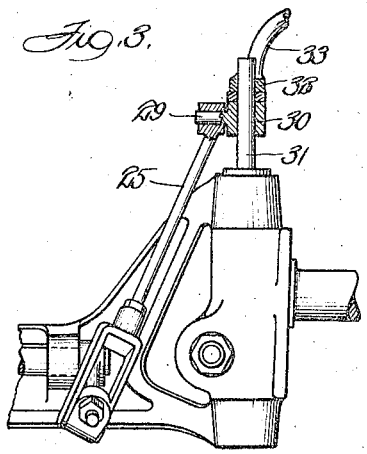
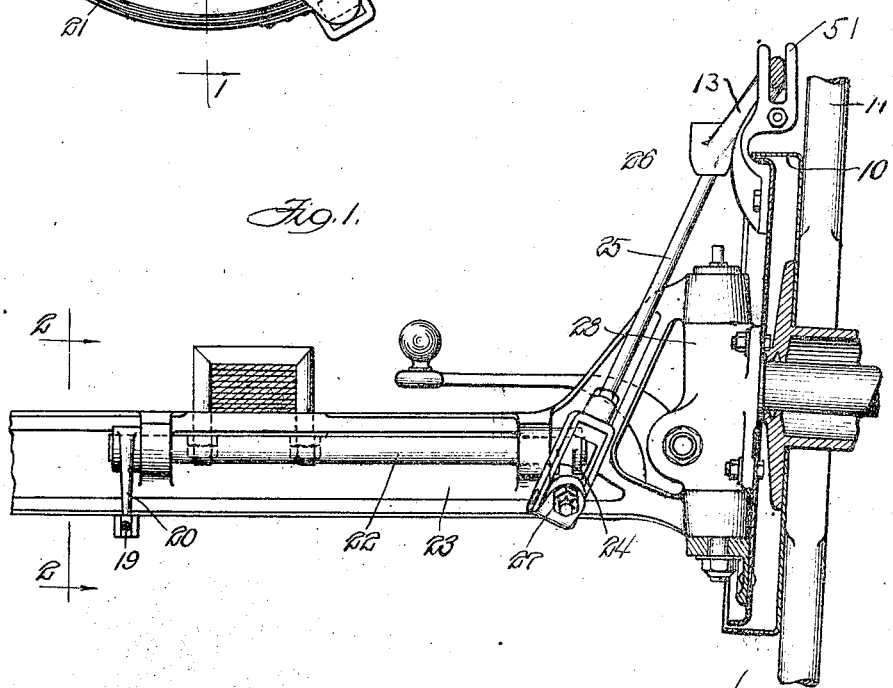
Inventor
ADIEL YEAMAN DODGE Nov. 1, 1927.　　　　　　　　　　　　　　　1,647,397
A. Y. DODGE
BRAKE
Filed March 29, 1924　　　2 Sheets-Sheet 2

INVENTOR
ADIEL YEAMAN DODGE
BY
ATTORNEY

Patented Nov. 1, 1927.

1,647,397

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed March 29, 1924. Serial No. 702,766.

My invention relates to brake construction. One of the objects of my invention is to provide an improved brake construction for the front wheels of automobiles; a further object of my invention is to provide an improved connection between the reach rod and an external brake for the front wheel; further objects will appear from the description and claims.

In the drawings in which two embodiments of my invention are shown;

Fig. 1 is a sectional view on the line 1—1 of Fig. 2 of a front wheel brake, axle and associated parts.

Fig. 2 is a sectional view on the line 2—2 of Fig. 1.

Fig. 3 is a rear view of a front axle and steering knuckle showing a different form of transmission from the reach rod to the brake.

Figure 4:
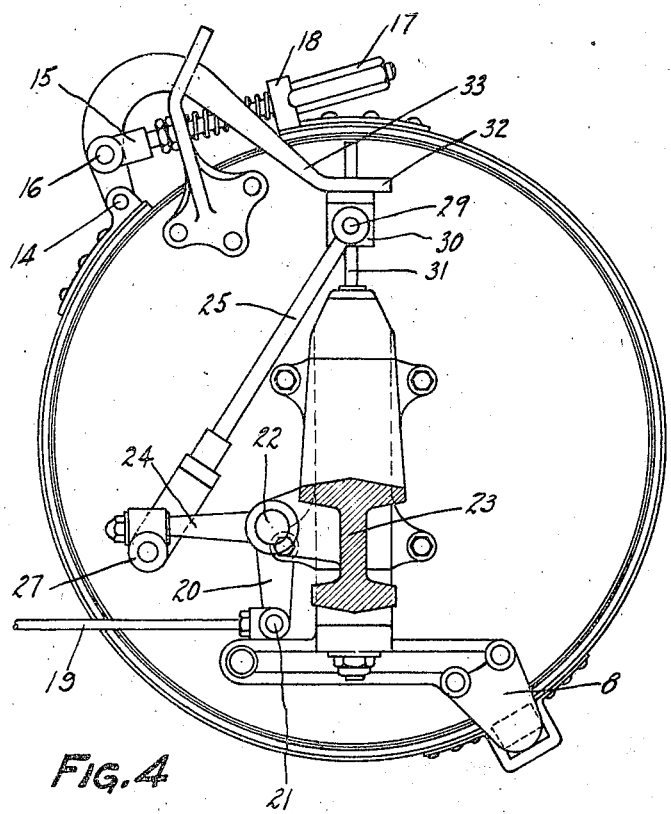
Fig. 4 is a sectional view corresponding to Fig. 1, but showing the modification of Fig. 3.

The brake itself may be similar to the external band brakes now in use, comprising a brake drum 10 secured to the front wheel 11, a flexible brake band 12, surrounding the brake drum, a lever 13 pivotally connected at 14 with one end of the brake band, a link 15 pivotally connected at 16 with the lever 13, an adjusting nut 17, threaded on the end of the link 15, and an abutment 18, secured to the other end of the brake band, and engaged by the adjusting nut 17.

The transmission from the reach rod 19 to the lever 13 comprises a rock-arm 20, pivoted at 21 to the reach rod 19, a rock shaft 22, mounted on the front axle 23, a rock arm 24 mounted on the rock shaft 22, and a link 25 having a ball and socket joint connection at 26 with the lever 13 and having a sort of universal joint connection at 27 with the rock arm 24. The ball and socket joint 26 is located adjacent the axis of the steering knuckle 28, (although offset slightly with respect thereto for a purpose hereinafter referred to). This ball and socket joint moves substantially vertically so that its distance from the axis of the steering knuckle remains substantially the same during its movement. Because of this location and movement of the ball and socket joint, the swiveling movement of the steering knuckle in turning does not materially affect the action of the brake pedal. It does, however, affect the braking action to a slight extent in that the ball and socket joint moves in the arc of a very small circle about the axis of the steering knuckle during the swiveling movement of the steering knuckle which has the effect of relieving the outside wheel in turning.

The construction shown in Fig. 3 may be substantially the same as that just described except that here the upper end of the link 25 is pivotally connected at 29 with a sliding sleeve 30, which is slidable on a vertical guide 31, which vertical guide may be located substantially in alignment with the axis of the steering knuckle. This slidable sleeve acts on the forked end 32 of the bent lever 33, which straddles the guide 31 and which corresponds to the lever 13 of the construction shown in Fig. 2.

In order to provide clearance for the steering movement of wheel 11, as the steering knuckle swings about its pivot, the link 25 is inclined downwardly away from the wheel. This inclination of the link causes a side thrust on the lever 13. In order to take care of this side thrust, I provide the bracket 50 which supports the link 15 with an upwardly extending forked portion 51, in which the lever 13 is guided and supported laterally against side thrust.

When the brakes are applied, tension on rod 19 rocks lever 20 to push upwardly on link 25 to rock lever 13 to contract the brake band 12.

Having thus described my invention, what I claim as new and desire to secure by Letters Patent of the United States is:

1. A steerable wheel brake construction comprising an axle provided with a steering knuckle, a steerable wheel mounted on said knuckle to swing about the axis thereof in steering, a brake drum mounted on said wheel, an external brake band embracing said drum, and transmission means for actuating said brake band, comprising a lever which swings with the steering movement of the steerable wheel and has one end above said steering knuckle and movable approximately in alignment with the axis of the steering knuckle, a slotted guide embracing said lever, direction changing transmission mounted on said axle, and an elongated outwardly inclined transmission member secured at one end to said end of said lever and connected to the end of said direction-changing transmission.

2. A steerable wheel brake construction comprising an axle provided with a steering knuckle, a steerable wheel mounted on said knuckle to swing about the axis thereof in steering, a brake drum mounted on said wheel, an external brake band embracing said drum, and transmission means for actuating said brake band, comprising a lever which swings with the steering movement of the steerable wheel and has one end above said steering knuckle and movable approximately in alignment with the axis of the steering knuckle, a guide also swinging with the wheel and engaging said lever, direction changing transmission mounted on said axle, an elongated transmission member secured at one end to said end of said lever and extending to said direction changing transmission, said elongated member being inclined downwardly and away from said steering wheel to provide clearance for the steering movement of the wheel.

3. A steerable wheel brake construction comprising an axle provided with a steering knuckle, a steerable wheel mounted on said knuckle to swing about the axis thereof in steering, a brake drum mounted on said wheel, an external brake band embracing said drum, and transmission means for actuating said brake band, comprising a lever which swings with the steering movement of the steerable wheel and has one end above said steering knuckle and movable approximately in alignment with the axis of the steering knuckle, means carried by the knuckle for supporting the lever against side thrust, direction changing transmission mounted on said axle, and an elongated transmission member secured at one end to said end of said lever and extending to said direction changing transmission, said direction changing transmission comprising a lever pivotally mounted on said axle, and said elongated member comprising a link pivotally connected at its ends to said levers respectively.

4. A steerable wheel brake construction comprising an axle provided with a steering knuckle, a steerable wheel mounted on said knuckle to swing about the axis thereof in steering, a brake drum mounted on said wheel, an external brake band embracing said drum, and transmission means for actuating said brake band, comprising a lever which swings with steering movement of the steering wheel, and a link pivotally connected to said lever and inclined downwardly and away from said steering wheel to provide clearance for the steering movement of the wheel, and a bracket mounted to swing with said steering knuckle and provided with means for supporting the lever against side thrust due to the inclination of said link.

5. A steerable wheel brake construction comprising an axle provided with a steering knuckle, a steerable wheel mounted on said knuckle to swing about the axis thereof in steering, a brake drum mounted on said wheel, an external brake band embracing said drum, and transmission means for actuating said brake band, comprising a lever which swings with steering movement of the steering wheel, a member (31) engaging the end of the lever and guiding it in the steering axis, and a transmission device engaging the end of the lever and supported independently of the knuckle.

In witness whereof, I have hereunto subscribed my name.

ADIEL Y. DODGE.